S. GORDON.
LANTERN HOOK.
APPLICATION FILED JAN. 22, 1910.
978,734.
Patented Dec. 13, 1910.
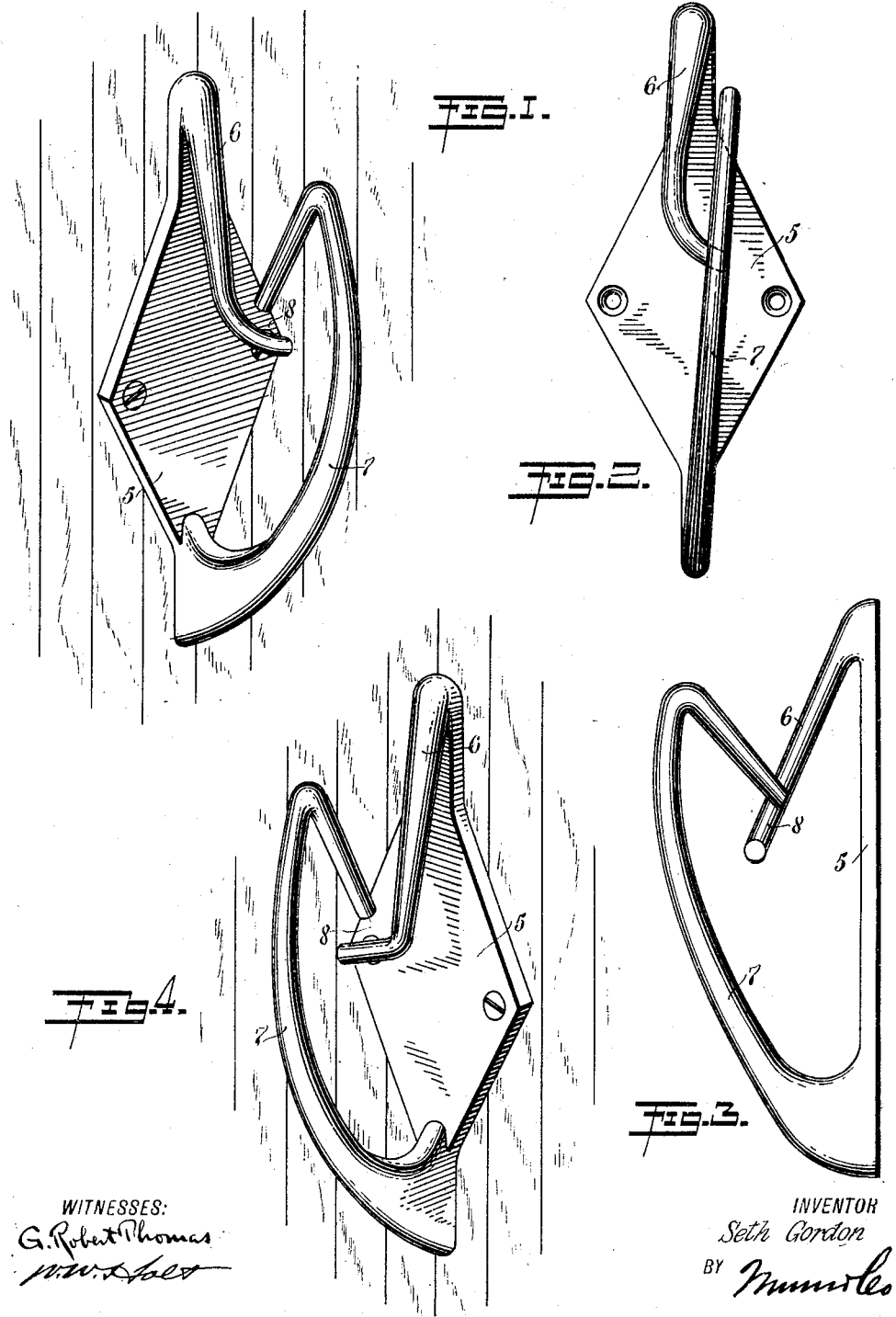
WITNESSES:
INVENTOR
Seth Gordon
BY
ATTORNEYS

UNITED STATES PATENT OFFICE.

SETH GORDON, OF CHAZY, NEW YORK.

LANTERN-HOOK.

978,734.   Specification of Letters Patent.   Patented Dec. 13, 1910.

Application filed January 22, 1910. Serial No. 539,609.

*To all whom it may concern:*

Be it known that I, SETH GORDON, a citizen of the United States, and a resident of Chazy, in the county of Clinton and State of New York, have invented a new and Improved Lantern-Hook, of which the following is a full, clear, and exact description.

The invention is an improvement in hooks, more especially for suspending lanterns, and has in view a hook in which the possible accidental disengagement of the lantern bail or other article suspended is prevented, the hook comprising a wall bracket or other attaching member having prongs extending from its opposite end portions outwardly toward the center of the bracket, with the ends of the prongs spaced apart and arranged to prevent the direct engagement and disengagement of the lantern bail.

Reference is to be had to the accompanying drawings forming a part of this specification, in which similar characters of reference indicate corresponding parts in all the views.

Figure 1 is a perspective view of a hook constructed in accordance with my invention; Fig. 2 is a front face view of the same; Fig. 3 is a side view of the hook; and Fig. 4 is a perspective view of the hook, looking from the side opposite to that of Fig. 1.

The hook comprises a wall bracket or other attaching member 5, having prongs 6 and 7, the bracket preferably being in the nature of a plate of diamond form having screw-holes adjacent to the side corners, with the prongs 6 and 7 respectively extending from the upper and lower end portions thereof, the prong 6 inclining abruptly downwardly and outwardly from the bracket and also inclined laterally, as viewed from the front, with the free end about midway the height of the bracket curved to that side from which the prong inclines in passing downwardly. The prong 7 curves outwardly and upwardly from the bracket, with its lower end or butt made relatively thick, to insure strength, the prong inclining laterally to the opposite side of the bracket from the prong 6, as viewed from the front, and extends to a point near the height of the top of the wall plate, where it abruptly turns toward the center of the plate and overlies the laterally-curved end of the prong 6, and forms in connection therewith an approximately L-shaped passage 8, the same having an approximately upright portion leading in between the prongs at the top and the laterally-curved or inclined portion at the bottom. Through this passage the bail of the lantern or other suspending device of any article must pass in engaging and disengaging the same on and from the hook. Thus, in passing the bail of the lantern over the prong 7, it is turned edgewise to allow it to pass over the outer portion of the prong 7 through the passage 8, after which the bail revolves a quarter of a turn in seating on the fork of the prong. In removing the lantern, the bail is raised and given a quarter of a turn to allow it to escape past the ends of the prongs. By this arrangement the ends of the prongs form a guard for the hook and prevent the possible accidental disengagement of the article suspended.

The hook in practice is made of malleable metal in order that the prongs may not be easily broken.

Having thus described my invention, I claim as new and desire to secure by Letters Patent:

1. In a hook for suspending lanterns and other articles, a support, a prong extending downwardly and forwardly from the support, having a laterally offset end, and a prong extending forwardly and upwardly from the support, having a downwardly and rearwardly-extending end arranged at the side of and spaced from the first mentioned prong and arranged over and spaced from the said laterally offset end.

2. In a hook for suspending lanterns and other articles, a wall bracket, and prongs extended outwardly from the opposite end portions of the bracket, with the end portions of the prongs arranged one over the top of the other and having between each other a passage leading in from the top provided with turn at the bottom offset to one side of one of the prongs.

3. In a hook for suspending lanterns and other articles, a wall bracket, a prong inclining downwardly and outwardly from the upper portion of the bracket and having a laterally-turned end, and a prong inclining upwardly and outwardly from the lower portion of the bracket and having a downwardly and inwardly turned end overlying the laterally-turned end of the first-named prong and forming in connection therewith a laterally-extending entrance and exit passage to and from the hook.

4. In a lantern hook, a wall bracket, a prong inclining downwardly and outwardly from the upper portion of the bracket and inclined toward one side of the bracket, with the end of the prong turned laterally toward the opposite side of the bracket, and a prong curved outwardly and upwardly from the lower portion of the bracket and inclined to that side of the bracket from which the first-named prong inclines and having its end downwardly and inwardly inclined and overlying the laterally-turned end of the first prong and forming in connection therewith a laterally-extending passage.

5. In a hook for suspending lanterns and other articles, a wall bracket, a prong extended outwardly and upwardly from the lower portion of the bracket, and a prong extended downwardly and outwardly from the upper portion of the bracket, with the end portions of the prongs shaped and arranged to provide an entrance and exit passage for the article, of approximately L-form.

In testimony whereof I have signed my name to this specification in the presence of two subscribing witnesses.

SETH GORDON.

Witnesses:
OLIVER LA FONTAINE, Jr.,
THOMAS H. DICKINSON.